United States Patent (10) Patent No.: US 7,170,512 B2
Southwell et al. (45) Date of Patent: Jan. 30, 2007

(54) INDEX PROCESSOR (75) Inventors: Trefor Southwell, Bristol (GB); Magne Sandven, Notodden (NO)

(73) Assignee: STMicroelectronics Limited, Bristol (GB)

( * ) Notice: Subject to any disclaimer, the term of this patent is extended or adjusted under 35 U.S.C. 154(b) by 627 days.

(21) Appl. No.: 10/133,971

(22) Filed: Apr. 26, 2002

(65) Prior Publication Data

US 2003/0011592 A1 Jan. 16, 2003

(30) Foreign Application Priority Data

Apr. 27, 2001 (EP) .................... 01303889

(51) Int. Cl.
*G06T 17/00* (2006.01)
(52) U.S. Cl. .................................... 345/420
(58) Field of Classification Search ............. 345/420
See application file for complete search history.

(56) References Cited

U.S. PATENT DOCUMENTS 5,812,136 A    9/1998  Keondjian ............. 345/419
5,821,940 A *  10/1998 Morgan et al. .......... 345/420
6,078,331 A *  6/2000  Pulli et al. ............ 345/423
6,597,356 B1 * 7/2003  Moreton et al. ......... 345/423

FOREIGN PATENT DOCUMENTS

EP    0 930 582 A2    7/1999
EP    0930582 A2 *    7/1999

OTHER PUBLICATIONS

Foley et al. Computer Graphics: Principles and Practice. Addison-Wesley Publishing Co. 1997. p. 166-170.*
Bar-Yehuda, R. et al., "Time/Space Tradeoffs for Polygon Mesh Rendering," *ACM Transactions on Graphics*, 15(2):141-152, Apr. 1996.

* cited by examiner

*Primary Examiner*—Ulka Chauhan
*Assistant Examiner*—Peter-Anthony Pappas
(74) *Attorney, Agent, or Firm*—Lisa K. Jorgenson; Timothy L. Boller; Seed IP Law Group PLLC (57) ABSTRACT

A graphic processor having an index processing unit for pre-processing a list of vertices making up a three-dimensional image. The method of pre-processing comprising the following steps. First, decomposing the three-dimensional image into a plurality of primitive elements each defined by a set of vertices, each vertex comprising vertex information stored in a vertex storage area and addressable by a vertex index. Then receiving said vertex indices and creating a set of unique indices identifying a batch of vertices and loading only the vertices corresponding to said unique indices into the vertex storage area. Finally creating transformed primitive elements from transformed vertex information addressed in the vertex storage area using the unique indices.

29 Claims, 4 Drawing Sheets

INDEX PROCESSOR

CROSS-REFERENCE TO RELATED APPLICATION

This application claims the benefit under 35 U.S.C. § 119(a) of European Application No. 01303889.8 filed Apr. 27, 2001, said European application hereby incorporated by reference in its entirety.

BACKGROUND OF THE INVENTION

1. Field of the Invention

The present invention relates to the processing of data entries stored in a buffer and associated with objects defined in three-dimensional space to be rendered onto a 2D display, and, more particularly, to the pre-processing of indices used to address the corresponding data entries.

2. Description of the Related Art

Modem multimedia applications place substantial requirements on computing resources. The video gaming industry is of significant commercial value to manufacturers who are constantly striving to develop powerful computing platforms, which provide users with a more exciting interactive experience. The graphics of a video game may be enhanced by creating images that are more life-like. In order for images to be more life-like a video game may require three-dimensional (3D) images and/or the real-time generation of such images. To satisfy these requirements, graphic processors need to perform more operations in a shorter space of time resulting in the need for machines with increased "number-crunching" ability.

The market for "3D" accelerator video cards for PCs and other computing platforms has grown drastically in recent years. It has been recognized that in using a 3D accelerator card, the main central processing unit (CPU) can be freed up by off-loading graphics processing traditionally performed by the CPU. Faster accelerator chips for rendering, or drawing an image allow for more realistic lighting models and higher onscreen polygon counts at higher resolutions.

The technique for rendering a 3D image onto a 2D display involves firstly breaking down the 3D image into polygons defined by primitives. A popular primitive used is a triangle having three vertices. Thus, a 3D image can be transformed into a plurality of triangles each being defined by a unique set of vertices where each vertex would typically contain information relating to co-ordinates (x, y, z), color, texture and lighting. It should be understood that a fairly large storage area is need to accommodate the vertex information. This storage area often referred to as the vertex buffer uses indices to address each of the vertices in the storage area. During the rendering of an image, the graphics processor often has to load and process the same vertex many times thereby replicating the amount of processing carried out.

A 3D card manufacturer, e.g., nVidia, may have a system which uses a transformed vertex cache such that whenever a vertex is required it is first looked up in a cache. If it is already present then the pre-transformed vertex is fetched from the cache. If the vertex is not in the cache, then the vertex is fetched, transformed and stored in the cache. The problem is that this system requires large amounts of cache memory and therefore silicon area. Alternatively, if a smaller cache is chosen only a small number of vertices may be cached and therefore a reasonable number of vertices are still transformed more than once.

Another known method is to pre-transform the whole vertex buffer, save it into main memory and then fetch the transformed vertices as indicated by their indices. The problem with this method is that not all of the vertices may actually be required. In addition, this method requires a large amount of external memory and therefore memory bandwidth.

At least one of the aims of the present embodiment of the invention is to provide a method for reducing vertex processing while still alleviating the aforementioned problems.

BRIEF SUMMARY OF THE INVENTION

According to one aspect of the present invention there is provided a system for rendering an image made up of primitive elements that are defined by a plurality of vertices the system having: a vertex storage area holding vertex information for each vertex addressable by a vertex index; an index processing unit for generating from said vertex indices a set of unique indices identifying a batch of vertices; and a graphics functional unit arranged to bad into the vertex storage area only the vertices associated with said generated set of unique indices and operable to transform vertices in said batch to create transformed primitive elements using the set of unique indices to address the vertex storage area.

According to another aspect of the present invention there is provided a method of rendering a three-dimensional image, the method comprising: decomposing the three-dimensional image into a plurality of primitive elements each defined by a set of vertices, each vertex comprising vertex information stored in a vertex storage area and addressable by a vertex index; receiving said vertex indices and creating a set of unique indices identifying a batch of vertices; loading only the vertices corresponding to said unique indices into the vertex storage area; and creating transformed primitive elements from transformed vertex information addressed in the vertex storage area using the unique indices.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The present invention will now be described by way of an example with reference to the accompanying drawings, in which.

DETAILED DESCRIPTION OF THE INVENTION

Figure 1:
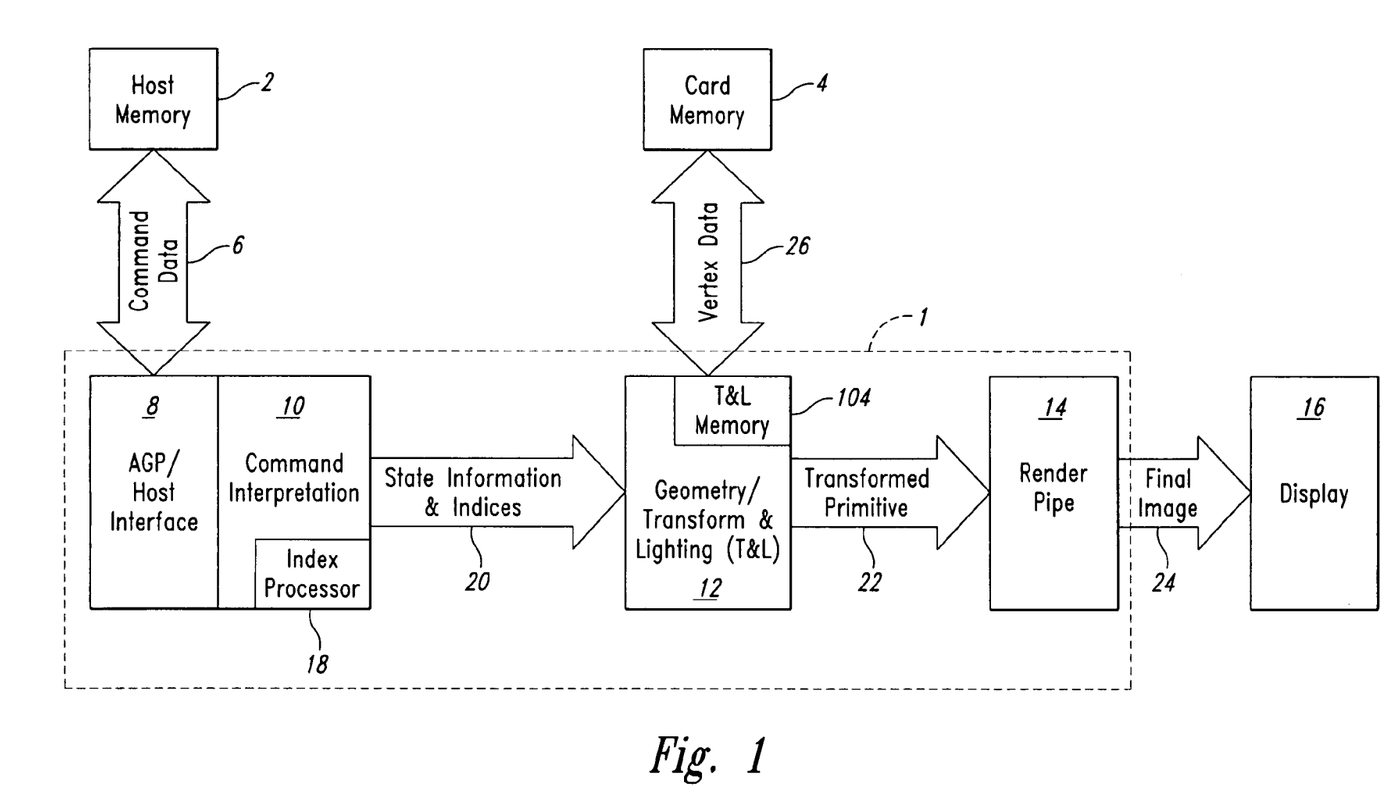
FIG. 1 shows a typical graphics pipe.

The graphics pipeline of a modern graphics chip as shown in FIG. 1 can be thought of as consisting of a graphics functional unit 1 have a geometry stage 12 and a rendering stage 14. The geometry stage 12 (referred to herein as the T&L block 12) is responsible for transformation and lighting (T&L) where the 3D image is converted into a number of polygons defined by a set of primitives, which are in turn defined by groups of vertices. These transformed primitives include vertices containing information relating to the co-ordinates (x, y, z), color, texture and lighting information of the pixels. A so-called "World Space Co-ordinate" co-ordinate system is used to define 3D frames that would each typically consist of many objects. Consider an interactive computer game where the user controls the motion of his player, as the player moves forward or backward the objects in the frame will need to be transformed so that they appear closer to and further away from the user, respectively. These transformations take place within the T&L block 12.

In the rendering stage 14, the transformed vertices are placed in a frame buffer in digital form where the frame memory needs to be continuously managed and updated as the frame changes. In the rendering stage the pixels are drawn and the frame buffer stores color and intensity information for each pixel that will be enabled. Therefore once a frame has been transformed, the speed of operation of the rendering stage is limited by the access speed at which pixel information can be read from or written to the frame buffer. The digital frame data is then converted to an analogue signal to be used to provide the final image for the actual on-screen (monitor) display 16.

FIG. 1 also shows a typical graphics pipe having an AGP 8 (Accelerated Graphics Port) acting as an interface to the system bus of the host. Broadly speaking, the host may be thought of as consisting of a main CPU and a large amount of host memory 2. In practice the host memory 2 might contain a graphics program. Typically, the AGP receives a command stream 6 using either DirectX or OpenGL from the host memory 2. DirectX and OpenGL are Application Programming Interfaces (APIs), which lie between the application software, for example a 3D drawing package or computer program, and the actual 3D chip hardware. It was recognized by industry that various 3D chip manufacturers were constructing chips having different hardware configurations and it was impossible for software developers to build software that could run on all of these different chip sets. The solution is to use an API, whereby the software programmer writes code using standardized commands that are then translated by the API for a specific hardware platform. In this manner, the API translates the graphics data of a particular application program into a command stream 6 representing graphics data that is recognizable by a specific 3D accelerator chip.

In FIG. 1 the command stream 6 would be representative of graphics data, translated using either DirectX or OpenGLAPI's, which is received by the AGP 8. Broadly speaking, the command stream 6 consists of state changes and drawing commands. State changes as the name suggests convey state change information, for example texture information and/or whether lights are enabled or disabled. The drawing command consists of a call to a specific primitive. A primitive is the basic building block used to construct the polygons that make up the 3D object.

The graphics pipe also comprises a command interpretation stage 10 which incorporates an index processor 18, the function of which will be described in more detail hereinafter. The command interpretation stage 10 generates state information and indices 20 to the T&L block 12.

FIG. 1 also shows a 3D card memory 4 that provides vertex data 26 to the T&L block 12 of the graphics pipe. The card memory 4 contains a vertex data buffer 40 as shown in more detail and discussed later with respect to FIG. 3.

Thus, in one embodiment, the graphics functional unit is a pipeline comprising: a host interface port 8 providing an interface to an external host having an external memory holding drawing commands; a command interpretation unit 10 for receiving drawing commands from the external memory of said host; a geometry unit 12 for defining the primitive elements in said three-dimensional image; and a rendering unit 16 for receiving said transformed primitive elements and for displaying the final two-dimensional image.

Figure 2:
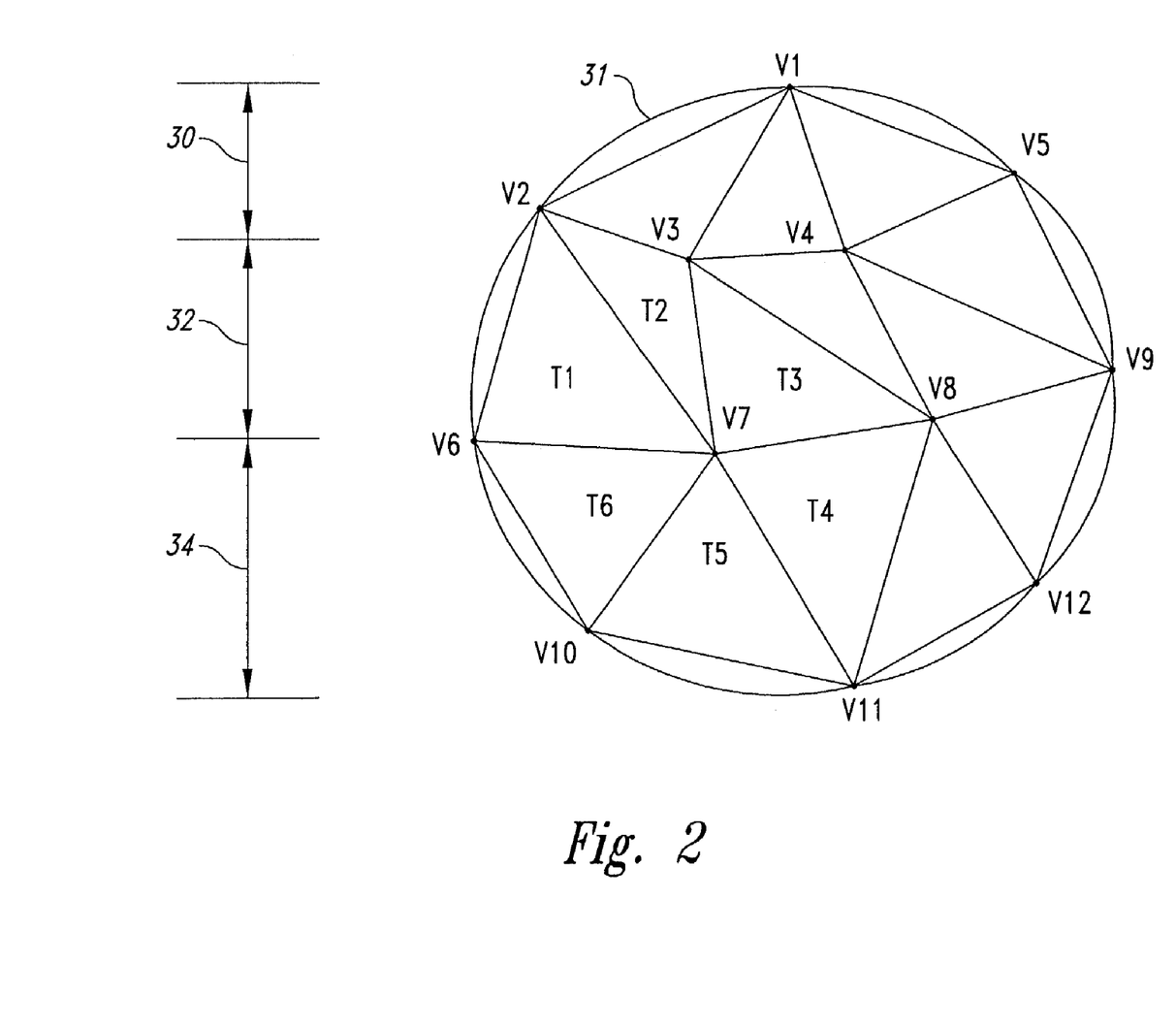
FIG. 2 shows an example of a spherical object.

Reference will now be made to FIG. 2 to explain an example of primitives defining spherical object 31. The spherical object 31 may be drawn using various primitives. That is, the top-part 30 of the sphere may be drawn using a so-called "triangle fan," primitive whereby the fan is composed of the following triangle fan primitives, i.e., (V1, V2, V3), (V1, V3, V4) and (V1, V4, V5), all having the common vertex V1. In this case, the vertices can be accessed sequentially one at a time from memory as the fan progresses. For example, if the common vertex V1 and a second vertex V2 has been specified, each triangle of the fan can be created by specifying each of the vertices V3, V4, and V5 sequentially. The central part 32 of the spherical object 31 is drawn using a so-called "triangle strip" primitive. In this case, the vertices can also be accessed sequentially one at a time from memory. For example, once the two vertices V2 and V6 have been specified, the first triangle can be created by specifying the vertex V7 and thereafter successive triangles of the triangle strip can be formed by specifying successive vertices, i.e., V3, V8, V4, V9 and so on. Finally the lower portion 34 of the spherical object 31 is drawn using a so-called "triangle list" primitive such that the triangles (V6, V7, V10), (V7, V11, V10), (V7, V8, V11), (V8, V12, V11) and (V8, V9, V12) are formed. In this case, each triangle is specified using all three vertices.

A specific example of a drawing command that makes use of a triangle list as the primitive is now described. Assume a drawing command makes a specific call to the triangle list consisting of the following four triangles:

Triangle0: (100, 256, 35)
Triangle1: (100, 35, 400)
Triangle2: (100, 45, 256)
Triangle3: (400, 35, 900)

Each triangle is defined by three vertices, where the numbers shown above within the brackets of each triangle, represent the vertex index in a vertex buffer. Thus referring back to FIG. 2, Triangle0 is analogous to triangle T5 where the vertices 100, 256 and 35 can be thought of as V7, V11 and V10 respectively. Triangle1 and Triangle2 have a common vertex of 100 (i.e., V7). Triangle1 and Triangle2 are analogous to triangles T4 and T6 respectively where the vertices 45 and 400 correspond to the vertices labeled as V6 and V8 respectively. Also Triangle3 corresponds to triangle T7 and the vertices 400, 25 and 900 correspond to the vertices V8, V11 and V12 respectively.

Figure 3:
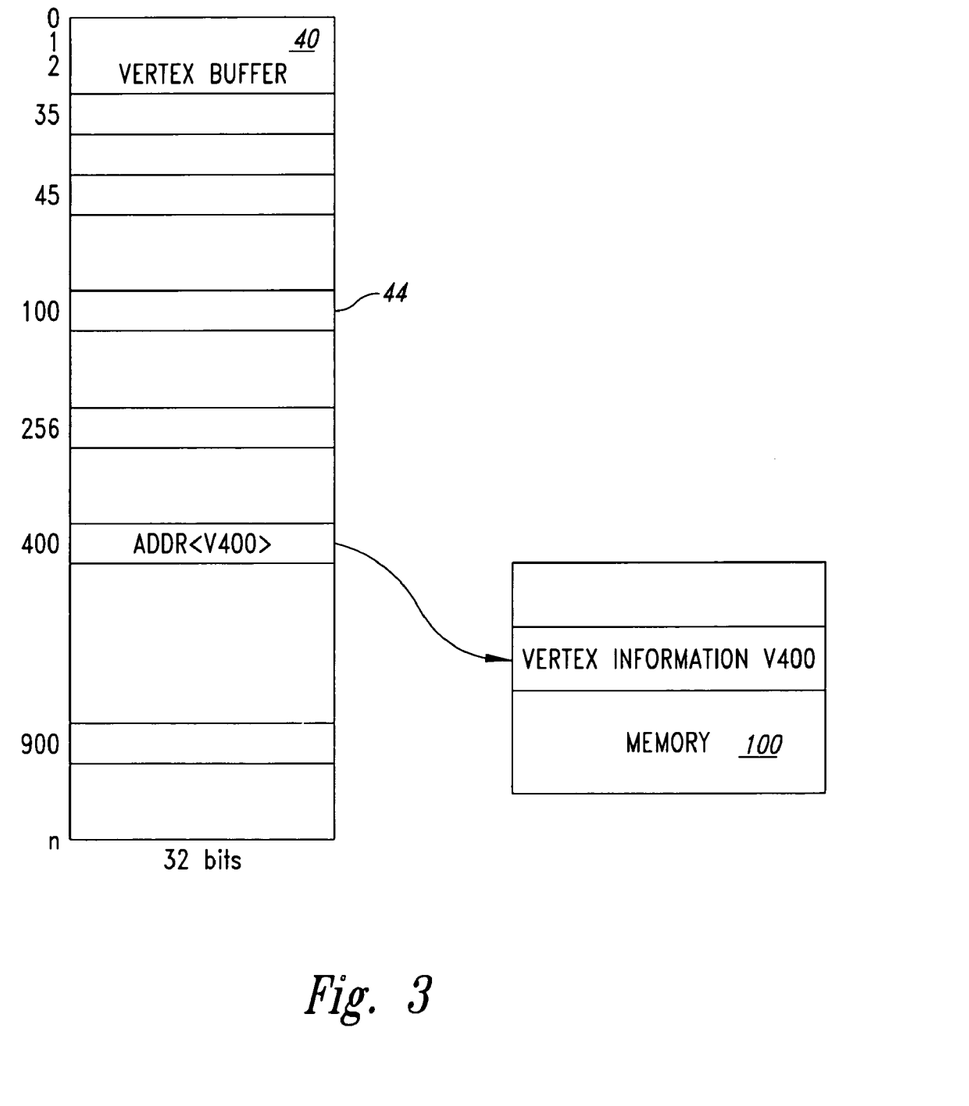
FIG. 3 shows the structure of a vertex buffer.

The vertex data buffer 40 in the card memory 4 stores vertex information and uses an index to address the vertex information. FIG. 3 shows that the indexes run from a starting value of V0 to Vn. It should be appreciated that the actual index is a unique number corresponding to each memory location. A vertex can then be uniquely identified by its index. In practice, the vertex buffer may be large with the indices pointing to vertex locations where the locations are not necessarily contiguous in memory 100. Each index serves as a pointer to the storage location in memory 100 holding information of a specific vertex and may be an address of, e.g., 32 bits in length. The actual vertex information to be stored is dependent on the amount of memory available and the configuration particular to each 3D card. It should be understood that the memory 100 may be physically implemented in the card memory 4 or the host memory 2 or distributed between the two. In any event, the amount of information stored for each vertex is relatively large (typically greater than 1024 bits and sometimes as much as 5120 bits) and includes at least data relating to at least the co-ordinates (x, y, z), lighting, texture and color information.

In the example given in FIG. 2, assume now that the spherical object 31 was constructed purely using a 'triangle list' primitive. Then if one considers the vertex V7, it will be apparent that this vertex will need to be processed at least six times corresponding to each of the six triangles T1, T2, T3, T4, T5 and T6 it forms part of. Therefore, in known systems the approach would be to manipulate the vertex information (i.e., between 1024 and 5120 bits) six times. In contrast, the present embodiment improves processing efficiency by a solution where the reference indices of the vertex data buffer 40 (for example having only 16 or 32 bits) are manipulated instead of the vertex data per se.

The functionality associated with the present embodiment is provided by the index processor unit 18 of FIG. 1. Consider the example described earlier having the following triangle list:

Triangle0: (100, 256, 35)
Triangle1: (100, 35, 400)
Triangle2: (100, 46, 256)
Triangle3: (400, 35, 900)

For a system that does not contain an index processing unit 18, the T&L (Transform and Lighting) block 12 that makes up the geometry stage of the graphics pipe would have to load and process each of the vertices for each of Triangles0–3. In effect, twelve vertices would need to be loaded and processed including repeated loading and processing of certain vertices. Vertex 100 will need to be loaded and processed three times corresponding to Triangles 0, 1 and 2. Vertex 35 will need to be loaded and processed three times, vertex 400 twice, vertex 256 twice and so on.

The index processor 18 of the present embodiment reduces this replicated processing in allowing the T&L unit 12 to only have to manage a so-called unique vertices list which is a list of the six unique vertices, i.e., 100, 256, 35, 400, 45 and 900. To be able to reproduce the original triangle list a mapping of the list of indices into the unique vertices list is required. Therefore, the triangle representation with the new list would be as follows:

Triangle0: (0, 1, 2)
Triangle1: (0, 2, 3)
Triangle2: (0, 4, 1)
Triangle3: (3, 2, 5)

In other words, by looking up these indices in the unique vertices list (see mapping table 1) the original triangle list can be reproduced by only having to process 6 vertices instead of 12.

TABLE 1

| New index | Unique |
|---|---|
| 0 | 100 |
| 1 | 256 |
| 2 | 35 |
| 3 | 400 |
| 4 | 45 |
| 5 | 900 |

For Triangle0 the first new index is 0. In the table above we can see that 0 represents the original index 100.

Figure 4:
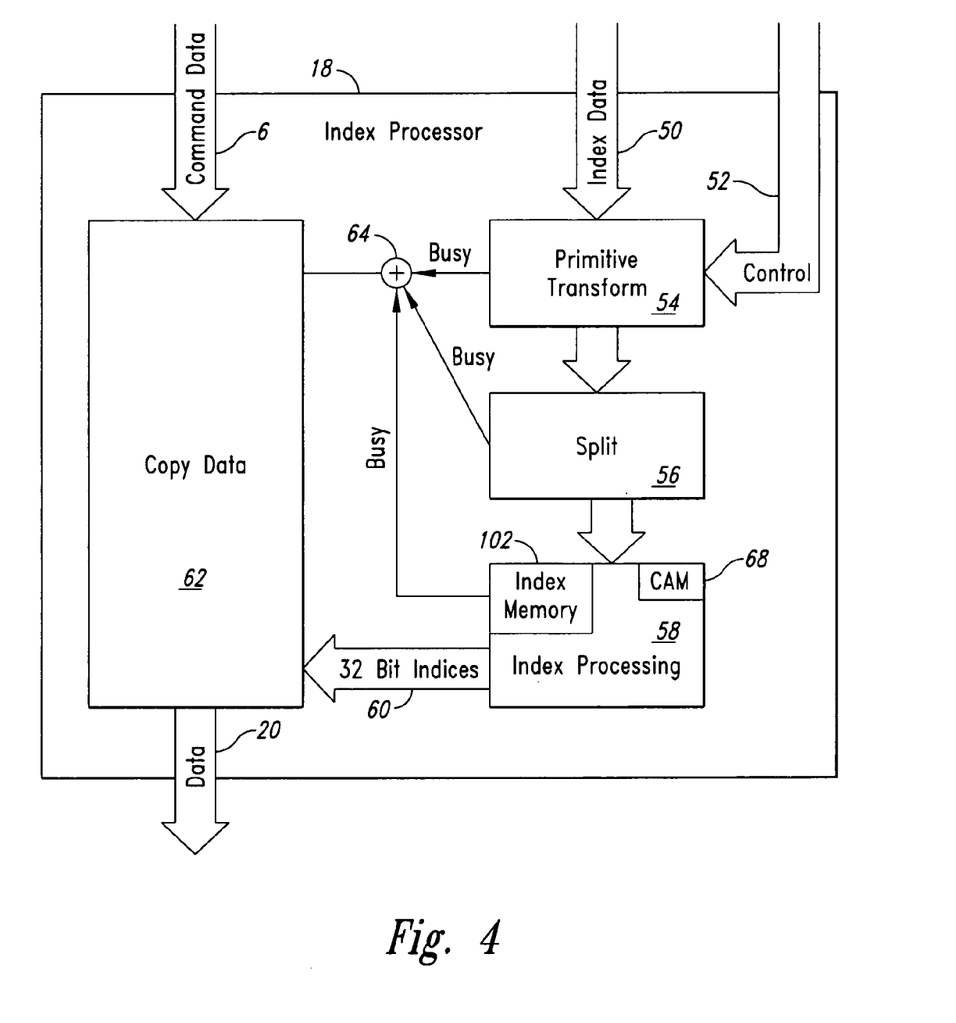
FIG. 4 shows the index processor of an embodiment of the present invention.

Therefore, at least one purpose of the index processor 18 of the present embodiment is to reduce vertex fetching from memory. The index processor 18 receives over the data path 50 indices (16- or 32-bit) in batches. However, the index processor has at least one additional purpose that concerns splitting primitives into batches using the split unit 56 that can fit into a T&L memory 104 of the T&L block 12. Although, as described before it is possible to store vertex information in memory 100 such as card memory 4 or host memory 2, memory access can be speeded up if an on-board T&L memory 104 is used. The T&L memory 104 will have a predetermined capacity, which corresponds to the batch size. Therefore, the split unit 56 of the index processor 18 determines the number of indices that make up a batch from the capacity of the T&L memory 104. The split unit 56 then starts a counter which is incremented for each received index up until a fixed value indicating the end of the batch. This way the T&L block 12 will not have to deal with several different types of primitives and replications if primitives do not fit into the T&L memory 104.

FIG. 4 shows the functional elements associated with the index processor 18 of the present embodiment. The two main inputs to the index processor 18 are i) the command data 6 consisting of drawing commands and/or state change data which may be in the form of header information and ii) index data 50. A third control input 52 is also shown. The inputs 6, 50 and 52 to the index processor 18 are received from the command interpretation unit 10. Information may be transferred across the input data paths 6, 50, 52 using data packets. The Index processor 18 can only receive data on one of the two input data ports at once (e.g., index data 50 or command data 6). Before any state data is received, the Copy Data block 62 must receive a header. If the following data is index data, no command data can be received until the indices are processed. To signal the end of a packet an end of packet (EOP) signal is used. A byte enable (BE) signal is sent with this EOP signal to indicate how many bytes of the data is valid. The BEs are only valid when an EOP is high.

The command data 6 is sent directly to the Copy Data block 62 where it is sent onto the T&L block 12 of the graphics pipe. The index processor 18 also consists of three additional functional units: the Primitive Transform unit 54, the Splitting unit 56 and the Index Processing unit 58. If any of the three blocks 54, 56, 58 are busy, the busy signals from each block are logically OR'ed together 64 and sent to the copy data block 62. This means that if any of the blocks 54, 56 or 58 are busy then the copy data block 62 is not allowed to receive any data.

In the preferred embodiment, the index processor is able to receive 16 and/or 32 bit indices over the index data path 50. The primitive transform block 54 performs the function of converting the received data indices 50 to 32-bit indices immediately when they are read.

The primitive transform block is also responsible for transforming the input primitive to a triangle list, a line list or points. At least the following primitives are supported, i.e., triangle fan, triangle strip and line strip. Triangle fans and triangle strips are transformed to triangle lists, line strips are transformed to line lists and points are not transformed.

The control input 52 contains control signal information consisting of a 32-bit signal having data specifying the original index size (i.e., 16 or 32 bits), whether flags are used and what the original primitive type is. The primitive transform unit 54 will continue to receive indices 50 until an EOP (End of Packet) data packet is received.

The index processing unit 56 represents the heart of the index processor 18 and is the actual stage when the indices are pre-processed to form unique lists for optimizing memory accessing and bandwidth. Each time an index is received 50, it is stored in an index memory 102 is used to store the (16- or 32-bit indices) that are received in batches. Then each index is looked up in a content addressable memory (CAM) 68 and if the index is found it is not sent as a unique index. If however, an index is received via the index data 50 which is not found in the CAM 68 then the index is stored in the index memory area 102 whereafter the missing index is added to the CAM and then sent along path 60 down the graphics pipe as a unique index for indices in the unique vertices list. The same process is repeated for each received index and a list of the unique indices mapped to the original indices is built up. The mapping between the new indices and the unique indices allows the original primitive to be re-built. A further example is now provided.

Assume the original transformed primitive has the following original indices:

(0, 2, 3), (4, 10, 2), (3, 10, 15), (10, 15, 20)

The unique indices that will be generated in the CAM 68 after receiving all the original indices will be:

0, 2, 3, 4, 10, 15, 20

If we assume that a successive mapping scheme is applied as already demonstrated in Table 1 then the new index list will be as shown below in table 2.

TABLE 2

| New index | Unique |
|---|---|
| 0 | 0 |
| 1 | 2 |
| 2 | 3 |
| 3 | 4 |
| 4 | 10 |
| 5 | 15 |
| 6 | 20 |

Therefore, the original primitive can be re-built by referring to the CAM 68 without replicating memory accesses for the same vertex information.

The mapped index list will be:

(0, 1, 2), (3, 4, 1), (2, 4, 5), (4, 5, 6)

By pre-processing the index data in this manner, the worst case that can occur is when the original indices are all unique (i.e., not replicated). In this case all of the vertices must be processed.

It should be understood that in practice each batch of indices will be larger then the number of entries in the CAM 68, but in an alternative embodiment it is possible to process batches larger than the CAM using the split unit 56. More generally, when the CAM fills up, the first entries in the CAM are saved into the index memory 102 where a pointer makes certain that the status of the CAM is correctly maintained in relation to the indices being processed at the time. In an alternative embodiment some indices may be replicated, but in general replications are detected due to locality of reference. More generally, if there are two or more vertices that make up a 3D image that are close to one another spatially, it is more likely that these vertices will be shared and therefore would be close to one another in the received 50 index list. This means that a fixed size CAM 68 will still work well in detecting most replications.

The index processor 18 makes use of the functionality afforded by the primitive transform block 54, the split block 56 and the index processing block 58 to instruct the graphics pipe which batches of vertices must be fetched. The index processor 18 then ensures only vertices that will be used are fetched into the pipeline. The graphics processor can then transform the batches and use the new indices to form primitives from the transformed data. The new indices are mapped to unique indices of the original batch of indices. The unique indices are saved along with the new indices in a CAM. Therefore, only a relatively small amount of memory space is required since the indices are only 32 bits, whereas the actual vertex data being referred to is usually between 1024 and 5120 bits. Processing the indices rather than the actual vertex data minimizes the memory bandwidth and processing requirements.

The invention has been developed primarily for use in graphics chips where speed and throughput of rendered polygons is paramount. However, it will be appreciated that the invention is not limited to use in this field. It should also be appreciated that while OpenGL and DirectX are the API's referred to herein, the preferred embodiment of the present invention is not limited to only these API's and can be used with others. Although the preferred embodiment describes 16- or 32-bit indices, the bit capacity of the indices may be varied depending on the size of address space to be referenced. Therefore alternative configurations could easily be designed that have a different bit capacity for specifying each index. Whilst the received index data 50 may be any size, the index processing block 58 turns all indices into a fixed size to simplify processing later on. In the embodiment described herein, the index processing unit 18 turns the indices into a fixed size of 32 bits which are then sent along path 60 for later processing down the graphics pipe.

In the description herein, for sake of brevity various implementations have been described using "absolutist" language (e.g., any, always, only, none, etc.). However, those having ordinary skill in the art will appreciate that virtually all sentences that employ such absolutist language should be interpreted "as if" preceded by temporizing language such as "preferably" or "in one implementation," unless context clearly dictates otherwise. In addition, those having ordinary skill in the art will also appreciate that all mandatory language (e.g., must, shall) appearing herein should be interpreted as permissive language (e.g., can, should), unless context clearly dictates otherwise.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for rendering an image made up of primitive elements that are defined by a plurality of vertices the system having:

a vertex storage area holding vertex information for each vertex addressable by a vertex index;

an index processing unit for generating from said vertex indices a set of unique indices identifying a batch of vertices to be transformed; and a graphics functional unit arranged to load into the vertex storage area only the vertices associated with said generated set of unique indices and operable to transform vertices in said batch to create transformed primitive elements using the set of unique indices to address the vertex storage area.

2. A system according to claim 1, which comprises means for generating a map between the indices in the unique set and a set of new indices, said new indices being used to directly address the vertex storage area.

3. A system according to claim 1 wherein said system is a graphics processor for rendering a three-dimensional image onto a two-dimensional display.

4. A system according to claim 3 wherein said graphics functional unit is a pipeline comprising:
a host interface port providing an interface to an external host having an external memory holding drawing commands;
a command interpretation unit for receiving drawing commands from the external memory of said host;
a geometry unit for defining the primitive elements in said three-dimensional image; and
a rendering unit for receiving said transformed primitive elements and for displaying the final two-dimensional image.

5. A system according to claim 4 wherein the index processing unit comprises:
a copy data block for receiving said drawing commands;
a primitive transform block for receiving said vertex indices; and
a unique list generator for generating the set of unique indices.

6. A system according to claim 5 wherein the index processing unit comprises a splitter unit for splitting indices into batches such that the vertices to be loaded can all fit into a storage area in the geometry unit.

7. A system according to claim 1, which comprises a display storage area in the form of a frame buffer containing an array of digital data entries each containing information corresponding to at least one pixel of a two-dimensional display.

8. A system according to claim 1 wherein said primitive element is a triangle defined by three vertices.

9. A system according to claim 1 wherein said vertex information comprises at least information relating to co-ordinates in the x, y and z directions, color, texture or lighting information.

10. A system according to claim 4 wherein said drawing commands are translated using an application programming interface into a format that is recognizable by said command interpretation unit of the graphics functional unit.

11. A method of rendering a three-dimensional image, the method comprising:
decomposing the three-dimensional image into a plurality of primitive elements each defined by a set of vertices, each vertex comprising vertex information stored in a vertex storage area and addressable by a vertex index;
receiving said vertex indices and creating from said received indices a set of unique indices identifying a batch of vertices to be transformed;
loading only the vertices corresponding to said unique indices into the vertex storage area; and
creating and displaying transformed primitive elements from transformed vertex information addressed in the vertex storage area using the unique indices.

12. A method according to claim 11 wherein each vertex in a batch is transformed only once.

13. A method according to claim 11 wherein said set of unique indices is mapped to a set of new indices.

14. A system for rendering a three-dimensional image, the system comprising:
means for decomposing the three-dimensional image into a plurality of primitive elements each defined by a set of vertices addressable by respective vertex indices, each vertex comprising vertex information stored in a vertex storage area;
means for receiving the vertex indices and creating from the received indices a set of unique indices identifying a batch of vertices to be transformed;
means for loading only the vertices corresponding to the unique indices into the vertex storage area; and
means for creating transformed primitive elements from transformed vertex information addressed in the vertex storage area using the unique indices.

15. The system of claim 14 wherein the means for creating transforms each vertex in a batch only once.

16. The system of claim 14 wherein the means for creating the set of unique indices includes means for creating a list that maps the received indices to the unique indices.

17. The system of claim 14, further comprising:
a host interface port providing an interface to an external host having an external memory holding drawing commands; and
a rendering unit for receiving the transformed primitive elements and for displaying a final two-dimensional image.

18. The system of claim 17 wherein the means for creating the set of unique indices includes:
a copy data block for receiving drawing commands;
a primitive transform block for receiving the vertex indices; and
a unique list generator for generating the set of unique indices.

19. The system of claim 14, further comprising a splitter unit for splitting indices into batches such that the vertices to be loaded can all fit into a storage area in a geometry unit.

20. A system for rendering an image made up of primitive elements that are defined by a plurality of vertices, the system comprising:
an index processing unit configured to generate from received vertex indices a set of unique indices identifying a batch of vertices to be to be transformed bycomparing by comparing a received vertex index with preceding received vertex indices and adding the received vertex index to the set of unique indices if it is not found in the preceding received vertex indices; and
a graphics functional unit arranged to load into a vertex storage area only vertex information for vertices associated with said generated set of unique indices, said vertex storage area addressable by the set of unique indices, wherein the graphics functional unit is configured to transform vertices in said batch to create transformed primitive elements using the set of unique indices to address the vertex storage area.

21. The system of claim 20 wherein the graphics functional unit is configured to generate a map between the indices in the unique set and a set of new indices, said new indices being used to directly address the vertex storage area.

22. The system of claim 20 wherein said system is a graphics processor for rendering a three-dimensional image onto a two-dimensional display.

23. The system of claim 22 wherein said graphics functional unit is a pipeline comprising:
a host interface port providing an interface to an external host having an external memory holding drawing commands;
a command interpretation unit for receiving drawing commands from the external memory of said host;

a geometry unit for defining the primitive elements in said three-dimensional image; and a rendering unit for receiving said transformed primitive elements and for displaying the final two-dimensional image.

24. The system of claim 23 wherein the index processing unit comprises:

a copy data block for receiving said drawing commands;

a primitive transform block for receiving said vertex indices; and a unique list generator for generating the set of unique indices.

25. The system of claim 24 wherein the index processing unit comprises a splitter unit for splitting indices into batches such that the vertices to be loaded can all fit into a storage area in the geometry unit.

26. The system of claim 20, further comprising a display storage area in the form of a frame buffer containing an array of digital data entries each containing information corresponding to at least one pixel of a two-dimensional display.

27. The system of claim 20 wherein said primitive element is a triangle defined by three vertices.

28. The system of claim 20 wherein said vertex information comprises at least information relating to co-ordinates in the x, y and z directions.

29. The system of claim 23 wherein said drawing commands are translated using an application programming interface into a format that is recognizable by said command interpretation unit of the graphics functional unit.

* * * * *